United States Patent [19]
Somma

[11] Patent Number: 5,345,846
[45] Date of Patent: Sep. 13, 1994

[54] TOOL HOLDER WITH RESHARPENABLE FORM TOOL INSERT

[75] Inventor: Herman R. Somma, Waterbury, Conn.

[73] Assignee: Somma Tool Company, Inc., Waterbury, Conn.

[21] Appl. No.: 35,164

[22] Filed: Mar. 22, 1993

[51] Int. Cl.⁵ .................... B23B 27/06; B23B 29/12
[52] U.S. Cl. ........................................ 82/13; 407/108
[58] Field of Search ................. 82/13, 160; 407/86, 407/91, 92, 94, 99, 107, 108

[56] References Cited

U.S. PATENT DOCUMENTS

| | | | |
|---|---|---|---|
| 875,495 | 12/1907 | Berkheiser | 82/13 |
| 1,336,155 | 4/1920 | Presby | 407/99 |
| 1,551,739 | 9/1925 | Gough et al. | 82/13 |
| 2,275,327 | 3/1942 | Sheridan et al. | 407/86 |
| 2,998,634 | 9/1961 | Raehrs et al. | 407/100 |
| 3,566,496 | 3/1971 | Kezirian | 407/99 |
| 4,573,832 | 3/1986 | Zinner | 407/99 |
| 4,669,924 | 6/1987 | Benson | 407/108 |
| 4,752,287 | 3/1986 | Oshnock et al. | 407/94 |
| 4,979,849 | 12/1990 | Kezran | 407/107 |
| 5,222,841 | 6/1993 | Simkhovich | 407/99 |

FOREIGN PATENT DOCUMENTS 966016  7/1957  Fed. Rep. of Germany .......... 82/13
1430570  3/1976  United Kingdom ................ 407/108

*Primary Examiner*—William E. Terrell
*Attorney, Agent, or Firm*—William C. Crutcher

[57] ABSTRACT

A form tool for a rotating workpiece comprising a removable resharpenable tool insert, a tool holder with a recess receiving the insert, and an adjustable tool insert support which will raise and relocate the insert in the tool holder recess after each resharpening. Preferably the tool insert support comprises one or more wedge-shaped members drawn into the recess with bolts, serving to clamp the resharpenable insert against the rear wall and top shelf of the recess. The resharpenable tool insert has a top planar surface adapted to be removed during resharpening, a rear surface and a profiled front form surface parallel to the rear surface. The front form surface intersects the top surface at a first included angle which is the complement of the sum of a preselected top rake angle "R" and a preselected front clearance angle "C". The tool holder recess has an overhanging shelf for locating the top planar surface of the insert and a rear wall for locating the rear surface of the insert, the rear wall and shelf forming a second included angle which is the supplement of the first included angle. A pair of sidewalls locate the form tool longitudinally in the recess and permit a range of form tools of different profiles with the same tool holder.

11 Claims, 2 Drawing Sheets

TOOL HOLDER WITH RESHARPENABLE FORM TOOL INSERT

BACKGROUND OF THE INVENTION

This invention relates generally to tool holders with resharpenable cutting tool inserts. More particularly, it relates to an improved quick-change holder for a resharpenable form tool insert.

Machine tools such as screw machines, turret lathes, CNC lathes and the like use various types of tools held in tool holders to remove material from a rotating workpiece. One common tool type is a resharpenable form tool with a integral dovetail, which is periodically resharpened on its top planar surface and repositioned in the dovetail slot. This type of tool can cause substantial downtime due to the need to relocate the resharpened planar surface on the horizontal center line of the rotating workpiece, so that the tool cutting edge addresses the workpiece at the proper top rake angle and front clearance angle.

Another type of form tool in common use employs a thin throwaway carbide insert, which is discarded after it becomes dull. The carbide insert is clamped from the top upon a tool support. Due to the need to support the thin insert, the tool support must often be especially configured with a profile corresponding to the form profile of the carbide insert, thereby adding to the expense of the form tool.

It would be desirable to provide a tool holder for a form tool which provides the economies of a resharpenable form tool without the accompanying delay and expense due to downtime required to reposition the tool after sharpening. It would also be desirable to provide a tool holder for a removable insert which is universal for a variety of insert shapes and sizes without requiring especially profiled supports for the tool inserts.

In order to quickly change a resharpenable tool insert, the tool holder must be adapted to relocate the resharpened insert quickly and efficiently in a consistent manner. There must also be means to securely and safely hold the tool insert to prevent slippage, breakage or chatter while it is removing material from the workpiece. Several varieties of quick change tool holders directed toward this end have been disclosed in the prior art. Exemplary of these are U.S. Pat. No. 2,241,024 issued May 6, 1941 to G. Wahnish, which employs different thickness compensation members to compensate for variation in the thickness of cutoff tools.

A resharpenable cutoff tool and holder, in which the cutoff tool is repositioned and clamped by means of a sliding adjustable wedge member is shown in U.S. Pat. No. 2,390,653 issued Dec. 11, 1945 to Kilgore.

Another type tool holder utilizing a sliding wedge secured by a draw-bolt is disclosed in U.S. Pat. No. 2,275,326 issued Mar. 3, 1942 to Severson and U.S. Pat. No. 2,488,172 issued Nov. 15, 1949 to Catlin, et al. The latter two patents clamp a tool bit against an overhanging shelf in the tool holder and support the resharpenable tool bit on a slidable wedge-shaped member. The location of the cutting edge of the resharpened tool changes after resharpening, even though it is replaced in the identical position in the tool holder.

Accordingly, one object of the present invention is to provide an improved resharpenable form tool and tool holder adapted for resharpening and quick replacement of the form tool.

Another object of the invention is to provide an improved universal quick change tool holder for a resharpenable insert which does not require resetting the tool holder with respect to the workpiece after resharpening.

Still another object of the invention is to provide an improved form tool holder for accurately locating a resharpenable insert at the same cutting position laterally, horizontally and vertically after resharpening.

SUMMARY OF THE INVENTION

Briefly stated, the invention is practiced by providing a form tool for a rotating workpiece comprising a removable resharpenable tool insert, a tool holder with a recess receiving the insert, and an adjustable tool insert support which will raise and relocate the insert in the tool holder recess after each resharpening. Preferably the tool insert support comprises one or more wedge-shaped members drawn into the recess with bolts, serving to clamp the resharpenable insert against the rear wall and top shelf of the recess. The resharpenable tool insert has a top planar surface adapted to be removed during resharpening, a rear surface and a front form surface parallel to the rear surface, i.e., any transverse cross-section through the form tool insert is bounded by a quadrilateral with parallel rear and front side lying in the rear surface and front form surface respectively. In the example illustrated in the preferred embodiment, the form tool insert also has a bottom planar surface parallel to the top planar surface, whereby the cross sectional quadrilateral becomes a parallelogram. The front form surface intersects the top planar surface at a first included angle which is the complement of the sum of a preselected top rake angle "R" and a preselected front clearance angle "C". The tool holder recess has an overhanging shelf for locating the top planar surface of the insert and a rear wall for locating the rear surface of the insert, the rear wall and shelf forming a second included angle, which is the supplement of the first included angle.

A pair of sidewalls locate the form tool longitudinally in the recess and permit use of a range of form tools having different profiles with the same tool holder.

DRAWING

The invention, both as to organization and method of practice, together with further objects and advantages thereof, will best be understood by reference to the following specification, taken in connection with the accompanying drawings, in which:

FIG. 1 is a perspective view of one form of my improved tool holder with resharpenable form tool insert, FIG. 2 is a top plan view of the FIG. 1 tool holder and form tool cooperating with a rotating workpiece, FIG. 3 is a side elevational view of the tool holder taken in cross section along lines A—A of FIG. 2, FIG. 4 is a side elevational view taken along lines A—A of FIG. 2, illustrating the same tool and form tool insert after several resharpenings, FIG. 5 is a schematic diagram illustrating the angular relationships described in the specification and the operation of the invention, FIG. 6 is a perspective view of a modified form of the invention, and FIG. 7 is a partial view, in cross section taken along a plane and looking in the direction of B—B in FIG. 6.

DESCRIPTION OF THE PREFERRED EMBODIMENT

Figure 1:
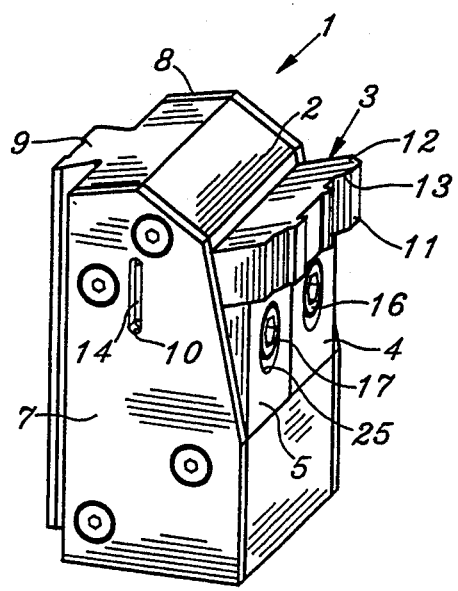

Referring now to FIG. 1 of the drawing, a perspective view is shown of a form tool in accordance with the present invention. The form tool, shown generally at 1, is made up of a tool holder 2 adapted to hold a resharpenable tool insert 3 in place by means of one or more wedge-shaped tool supports 4, 5. The tool insert 3 and tool supports 4, 5 are partially contained within a longitudinal recess 6 (see FIGS. 3 and 4) in the tool holder 2. The recess 6 is closed on opposite ends by means of sidewalls 7, 8 attached to the tool holder 2, using cap screws. Alternatively, the sidewalls may be integral with tool holder 2 so that recess 6 is an opening in the front face of the tool holder. Tool holder 2 may be adapted for attachment to the repositionable tool actuator of a conventional screw machine, turret lathe or the like so as to bring the tool insert 3 into engagement with a rotating workpiece. Any type of attachment may be employed, but FIG. 1 depicts a conventional dovetail 9 which will enable the tool holder 2 to be adjusted and clamped in a dovetail holder, which may be oriented at a preselected angle as designed by the machine tool manufacturer. Sidewalls 7, 8 serve to locate the tool holder insert 3 longitudinally in recess 6. Slots 10 may be provided to visually inspect the position of tool insert 3 or to allow removal of any foreign objects.

Tool insert 3 has a shape which is especially adapted for practice of the present invention and preferably has a body of resharpenable cutting tool material such as high speed steel or carbide of the type used in conventional cutting tools. Tool insert 3 is bounded by parallel top and bottom planar surfaces, and parallel front and rear surfaces, such that any cross-section through the tool insert forms a parallelogram. Insert 3 has a front form surface 11 providing a "clearance face" and a top planar surface 12 providing a "rake face". Surfaces 11 and 12 intersect along a cutting edge profile 13 adapted to remove material from a rotating workpiece. The front form surface 11 is ground into a tool insert blank in a conventional manner. A mathematical definition of surface 11 would define it as generated by the profiled line 13 serving as a generatrix moving along a straight line directrix, extending between the top and bottom of the tool insert 3.

Tool insert 3 includes a rear surface 14 having a straight line directrix which is parallel to the directrix of front form surface 11. Expressed in one way, front form surface 11 and rear surface 14 of the tool insert are parallel to one another. Expressed in another way, any transverse cross-section through form tool insert 3 is bounded by a quadrilateral with parallel rear and front sides lying on the parallel directrixes and also lying in the rear and front form surfaces respectively.

In the preferred embodiment, tool insert 3 also has a bottom planar surface 15 which is parallel to top planar surface 12. In this case, the quadrilateral bounding any transverse cross-section is necessarily a parallelogram. Tool insert 3 is of substantial thickness so as to permit resharpening several times by grinding off the top planar surface 12. Although the number of resharpenings and the reduction in thickness will vary considerably depending upon the type of tool and the type of cutting material used, a typical form tool of micro-grain carbide should permit fifteen to twenty-five resharpenings of the tool insert, removing 0.005 to 0.010 inches during each resharpening. Without limiting the scope of the present invention, the tool insert may typically have a thickness in the range between one-eighth inch and three-fourth inches, and permitting removal of approximately one-third of its initial thickness without substantially affecting its performance. After each resharpening, the tool is relocated by means of tool supports 4, 5, which are adjusted using draw screws 16, 17.

Figure 2:
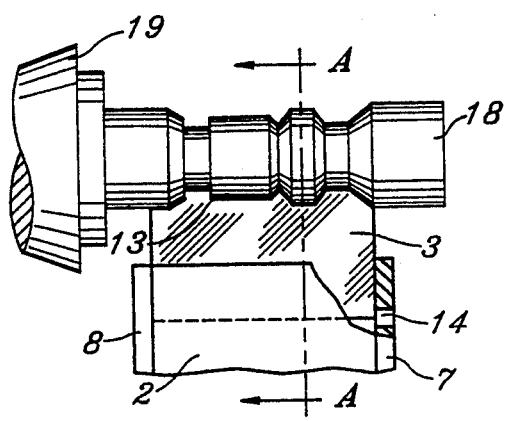

Referring to FIG. 2 of the drawing, tool insert 3 is shown cooperating with a rotating workpiece 18 consisting of rod stock held in a collet 19. The cutting edge line profile 13 diametrically forms workpiece 18.

Figure 3:
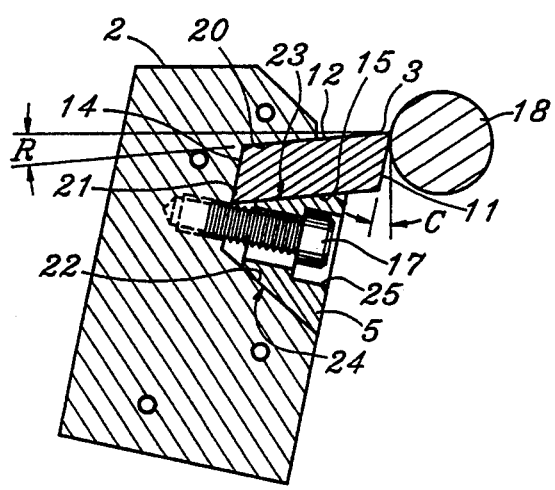
Figure 4:
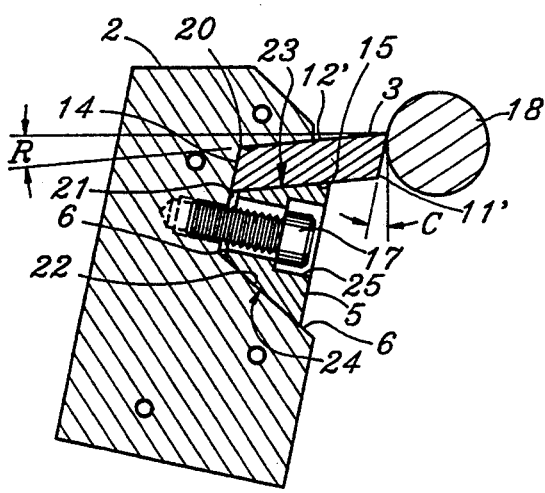

Referring to the side views of FIGS. 3 and 4, it is seen that recess 6 in the tool holder 2 is defined by a top overhanging shelf 20, a rear wall 21 and a bottom wall 22. Wedge member 5 is disposed between tool insert 3 and bottom wall 22 of recess 6 and includes opposite inclined surfaces 23, 24. When draw screw 17 is tightened, support member 5 is drawn into the recess and forced to move upwardly against tool holder 3. Upward movement of the tool supports is facilitated by vertical slots 25. Top planar surface 12 of tool insert 3 is located by shelf 20 of tool holder 2, and rear surface 14 of tool insert 3 is located by rear wall 21 of tool holder 2.

The tool holder orientation and the shape of the tool insert 3 are designed to form preselected rake and clearance angles with respect to the rotating workpiece, according to conventional practice. The tool holder orientation and tool insert shape are such that top planar surface 12 forms a preselected top rake angle "R" with the horizontal center line of the rotating workpiece. Furthermore, the directrix of front form surface 11 defines a front clearance angle "C" with a vertical line perpendicular to the horizontal center line. The top rake angle "R" and front clearance angle "C" are preselected for a designed linear cutting speed, tool material and workpiece material, and the angle of the dovetail tool holder, which is incorporated by the machine tool manufacturer as part of the tool holder design, as is known to those skilled in the art. In the preferred embodiment shown, the top rake angle is on the order of 5° and the front clearance angle is on the order of 12°. However, these will vary with different form profiles, cutting speeds and materials.

Top rake angle "R" as defined herein is assumed to be a positive rake angle. Also, front clearance angle "C" is shown by accepted convention to be positive. Therefore, by inspection of FIG. 3, it is apparent that the rake angle "R", clearance angle "C" and the angle included between top planar surface 12 and front form surface 11 of the insert add up to 90°.

Referring to FIG. 4 of the drawing, the same reference numerals are used as in connection with the previous FIG. 3. However, in this case, the top planar surface of the tool insert 3, which has been removed by repeated sharpening, is now designated with reference numeral 12', and the front form surface and rear surface, which are shorter due to resharpening are now designated 11' and 14'. Wedge-shaped support members 4, 5 have been drawn in almost to the bottom of recess 6. Support members 4, 5 may be designed to "bottom-out" at a preselected minimum thickness of insert 3. This is a safety feature which prohibits excessive resharpening of tool insert 3 beyond the preselected minimum thickness, since it will no longer be possible to clamp it in the tool holder.

Figure 5:
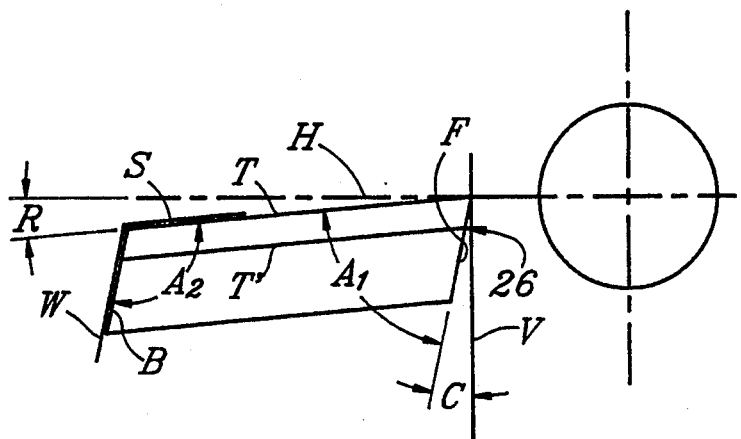

FIG. 5 of the drawing is a diagram illustrating operation of the invention. H is a horizontal center line of the rotating workpiece. V is a vertical line perpendicular to H. T is a line element in the top planar surface 13 forming a preselected top rake angle "R" with H. F is a line element in the front form surface 11 forming a front clearance angle "C" with V. B is a line element in the rear surface 14. S and W are line elements in the top shelf and rear wall respectively of the tool holder recess. By geometry, the lines T and F form a first included angle $A_1$ which is the complement of the sum of top rake angle R and front clearance angle C. Also by geometry, because of parallelism of F and B, elements T and B, as well as elements S and W in the top shelf and rear wall, form a second included angle $A_2$, which is the supplement of the first included angle $A_1$. When material is removed from the tool insert by sharpening, and the insert is replaced in the tool holder without clamping adjustment, the top surface is represented by T'. The intersection of T' and F is at a new location designated by reference numeral 26. It should be apparent that movement of the tool supports to clamp the tool insert will constrain the tool insert to relocate so that T' moves to the position previously occupied by T. The cutting edge at 26 is precisely relocated to the previous cutting edge position (at the intersection of H and V) before sharpening. In the prior art tool holders, it would be necessary for the operator to adjust the tool by other means to bring it back to center.

Figure 6:
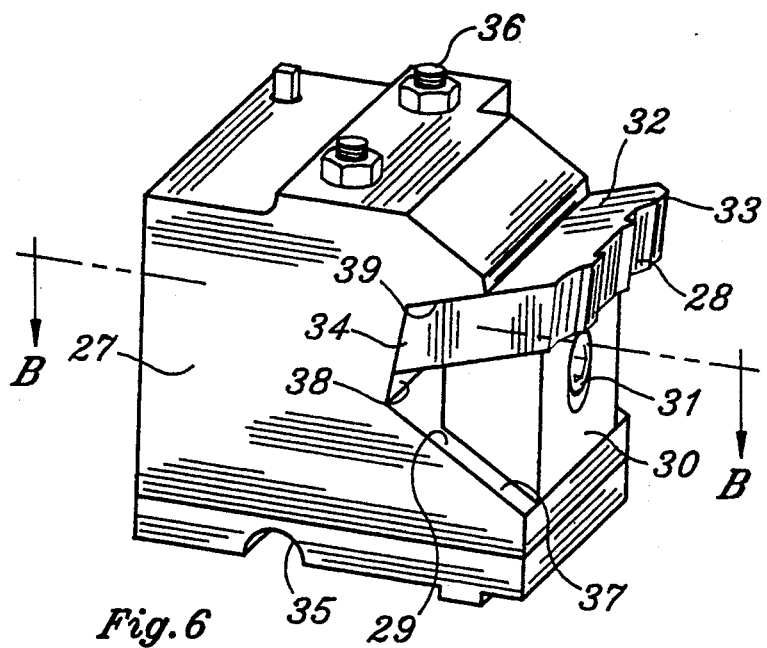
Figure 7:
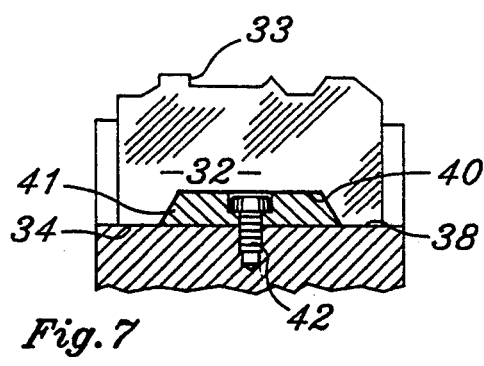

Reference to FIGS. 6 and 7 illustrate one of many possible modifications to the invention. Reference to FIG. 6 illustrates a tool holder 27 receiving a form tool insert 28 disposed in a recess 29 and supported by a single wedge-shaped tool support 30, which is adjusted by means of cap screw 31. Tool insert 28 has a top planar surface 32 as before, a front form surface 33 and a rear surface 34. See also the cross sectional view FIG. 7.

Tool body 27 is adapted to be held in a machine tool by means such as locating grooves 35 and attachment bolts 36. Recess 29 has a lower inclined surface 37, rear wall 38 and top shelf 39. All of the elements function as previously described, except there are no side walls. Instead, tool insert 32 is provided with a vertical slot 40 in its rear surface which is shaped to match a vertical piece 41 attached to tool holder body 27 by means of cap screws 42. Member 41 and slot 40 together form a cooperating key and keyway arrangement, and serve as a substitute for the sidewalls as a means for locating the tool insert longitudinally in the recess. Otherwise, the operation is as previously described. Repeated resharpening removes material from the top planar surface of the insert and the tool support is quickly raised to bring the tool cutting edge back on center. The tool insert 32 may move along the rear wall 38 on the vertical "key" 41.

While a wedge-shaped tool support is illustrated in the preferred embodiment, other possible arrangements for raising the tool insert in the recess may be employed, such as lifting pads with threaded members beneath, or the like. In the embodiment shown, the axis of the draw screw along each wedge-shaped tool support is located between and at an angle with respect to each of the inclined surfaces. However the axis of the draw screw may also be located on the lower inclined surface, as disclosed in the aforementioned Severson U.S. Pat. No. 2,275,326, as well as employing a differential screw. The preferred embodiment shown enables a greater ratio of vertical to horizontal travel as the cap screw is tightened, resulting in quicker tool changes.

While there has been described what is considered to be the preferred embodiment of the invention, other modifications will occur to those skilled in the art, and it is desired to secure in the appended claims all such modifications as fall within the true spirit and scope of the invention.

I claim:

1. A form tool for a rotating work piece, comprising:
   a removable, resharpenable form tool insert having a top planar surface providing a rake face, a rear surface and a front form surface providing a clearance face, said front form surface intersecting said top planar surface along a forming edge and defining a first included acute angle, any transverse cross section through said form tool insert being bounded by a quadrilateral having parallel rear and front sides lying in said rear surface and in said front form surface respectively,
   a toolholder defining a recess adapted to receive said form tool insert, said recess having an overhanging shelf for locating said top planar surface of the insert, a rear wall joined integrally with said overhanging shelf for locating said rear surface of the insert, and a bottom wall intersecting said rear wall said rear wall and said shelf defining a second included obtuse angle which is the supplement of said first included acute angle,
   means locating said tool insert longitudinally in said recess, and
   an adjustable tool insert support adapted to raise and relocate said insert in said recess along said rear wall after material is removed from said top planar surface after each resharpening and to clamp said insert against said rear wall and against said shelf said adjustable tool support comprising at least one wedge-shaped member and a threaded screw member having an axis and adapted to draw said wedge-shaped member into said recess, said wedge-shaped member defining first and second surfaces inclined to said axis and cooperating with said tool insert bottom surface and said recess bottom wall respectively, said wedge-shaped member defining a slot receiving said threaded screw member and adapted to move upwardly in said recess toward the shelf as the wedge-shaped member is drawn into said recess.

2. The combination according to claim 1, wherein said tool insert has a bottom planar surface parallel with said top planar surface, said quadrilateral comprising a parallelogram, and wherein said first surface of said wedge-shaped member disposed beneath said tool insert in said recess is also planar.

3. The combination according to claim 4, wherein said tool insert support defines slots therethrough receiving said threaded screw member.

4. The combination according to claim 1, wherein said tool insert locating means comprises a pair of sidewalls attached to said tool holder on either side of said recess.

5. The combination according to claim 1, wherein said tool insert locating means comprises a pair of spaced sidewalls formed integrally with the tool holder on either side of said recess.

6. The combination according to claim 1, wherein said tool insert locating means comprises a cooperating key and keyway arrangement, said key attached to said recess rear wall and said keyway defined in said tool insert rear surface.

7. The combination according to claim 1, wherein said tool insert support comprises at least one wedge-shaped member disposed beneath said tool insert in said recess, and at least one threaded member received in said toolholder, said wedge-shaped member defining a slot adapted to receive said threaded member extending therethrough, said threaded member cooperating with the tool holder to permit drawing said wedge-shaped member into said recess.

8. The combination according to claim 1, wherein said form tool insert has a thickness in the range between one-eighth of an inch and three-fourths of an inch, whereby approximately one-third of its thickness may be removed by resharpening without substantially affecting its performance.

9. The combination according to claim 1, wherein said resharpenable cutting tool material is high speed steel.

10. The combination according to claim 1, wherein said resharpenable cutting tool material is carbide.

11. A form tool for a rotating work piece, said form tool having a rake face forming a preselected positive rake angle "R" with a perpendicular to the work piece surface and having a clearance face forming a preselected positive clearance angle "C" with a tangent to said work piece surface, said form tool comprising:

a removable, resharpenable form tool insert having a top planar surface providing said rake face, a rear surface, a bottom planar surface and a front form surface providing said clearance face, any transverse cross-section through said form tool insert being bounded by a parallelogram having parallel rear and front sides lying in said rear surface and said front form surface respectively, and having parallel top and bottom sides lying in said top planar surface and said bottom planar surface respectively, said front form surface intersecting said top planar surface along a forming edge and defining a first included acute angle which is the complement of the sum of said preselected top rake angle "R" and said preselected front clearance angle "C", a toolholder defining a recess adapted to receive said form tool insert, said recess having an overhanging shelf for locating said top planar surface of the insert, a bottom wall, and a rear wall for locating said rear surface of the insert, said rear wall and said shelf defining a second included angle which is the supplement of said first included acute angle, means locating said tool insert longitudinally in said recess, and an adjustable tool insert support adapted to raise and relocate said tool insert in said recess along said rear wall after material is removed from said top planar surface after each resharpening and to clamp said insert against said rear wall ,and against said shelf, said tool insert support comprising a wedge-shaped member and a threaded screw member having an axis and arranged and adapted to draw said wedge-shaped member into said recess, said wedge-shaped member defining first and second surfaces inclined with respect to said screw member axis and cooperating with said tool insert wherein both first and second surfaces cooperate in raising said wedge-shaped member upwardly in said recess toward said shelf while relocating said tool insert, said wedge-shaped member defining a slot receiving said threaded screw member to accommodate upward movement of said wedge-shaped member toward said shelf as the wedge-shaped member is drawn into said recess.

* * * * *

UNITED STATES PATENT AND TRADEMARK OFFICE
CERTIFICATE OF CORRECTION

PATENT NO. : 5,345,846
DATED : September 13, 1994
INVENTOR(S) : Herman R. Somma

It is certified that error appears in the above-indentified patent and that said Letters Patent is hereby corrected as shown below:

The Drawing Sheet, consisting of Figs. 3 and 4, should be deleted to replace with the drawing sheet, consisting of Figs. 3 and 4, as shown on the attached page.

Signed and Sealed this

Eighth Day of November, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,345,846

DATED : Sep. 13, 1994

INVENTOR(S) : Herman R. Somma

Page 2 of 2

It is certified that error appears in the above-indentified patent and that said Letters Patent is hereby corrected as shown below:

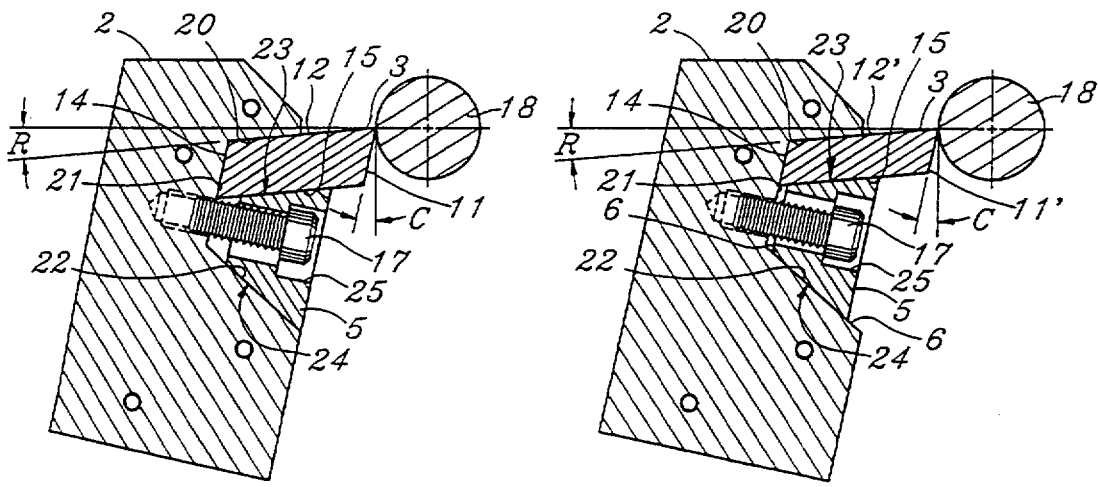

Fig. 3

Fig. 4